3,497,558
AUTOCONDENSATION OF ACETONE

Geza Kohan, Fredericton, New Brunswick, Ivan Palmer, Shawinigan, Quebec, and Nicholas Gravino, Montreal North, Quebec, Canada, assignors to Gulf Oil Canada, Limited, Toronto, Ontario, Canada, a corporation of Canada No Drawing. Filed Dec. 27, 1965, Ser. No. 516,749
Int. Cl. C07c 49/18, 49/48
U.S. Cl. 260—594      10 Claims

ABSTRACT OF THE DISCLOSURE

A process for making acetone condensation products, e.g. diacetone alcohol, mesityl oxide, isophorone, using small proportions of alkali metal hydroxide cataylst by mechanically dispersing concentrated aqueous solutions of the catalyst in the acetone to form a stable fine dispersion, maintaining the dispersion at appropriate conventional reaction temperature to complete the desired condensation, and recovering the product by conventional means. Catalyst proportions are so small they are not recovered. Stable mechanical dispersion of catalyst in the acetone is simply achieved, e.g. by forcing acetone and catalyst solution together through a zone of high liquid shear.

---

This invention relates to the autocondensation of acetone, and more particularly to a process for the autocondensation of acetone or diacetone alcohol, isophorone, and similar products, in the presence of an alkali metal hydroxide catalyst.

It is well known that acetone can be subjected to the action of alkali metal hydroxide catalysts to cause autocondensation of the acetone to diacetone alcohol, mesityl oxide, isophorone, higher condensation products, etc., the condensation usually yielding more than one of the foregoing products and the proportion of the various products formed varying with variations in the temperature at which the condensation takes place. Thus it is known that acetone can be condensed with the aid of alkali metal hydroxide catalysts at temperatures in the range of —20 to 50° C. to yield predominantly diacetone alcohol; at temperatures in the range between about 60 and 120° C. the condensation yields predominantly mesityl oxide (derived by splitting of water from previously formed diacetone alcohol); at temperatures in the range 130–235° C. the condensation yields predominantly isophorone, together with significant proportions of mesityl oxide and of xylitone and other higher boiling condensation products of acetone. In all cases the condensation is an equilibrium reaction; thus the effluent from the condensation reaction is a mixture of the condensation product or products, byproduct water if formed, and uncondensed acetone.

Acetone itself is not considered to be a solvent for alkali metal hydroxides. In the foregoing known autocondensations of acetone using an alkali metal hydroxide as catalyst, it has generally been the practice to add enough water to the acetone to cause the aqueous acetone to dissolve the alkali metal hydroxide or to add sufficient water to the alkali metal hydroxide to make the aqueous alkali metal hydroxide solution completely miscible with the acetone. Another expedient to achieve solubility of the alkali metal hydroxide in the acetone has been the addition of an alcohol, for example methanol, ethanol, or isopropanol, to the acetone in sufficient proportion to make it a solvent for the alkali metal hydroxide.

Both the foregoing expedients of adding water or alcohol to achieve miscibility of the acetone and alkali metal hydroxide are objectionable on the grounds that the desired products must subsequently be separated from the added material, thus incurring the cost of the separation. Alcohol is additionally objectionable on the grounds that it constitutes an additional chemical ingredient in the equilibrium mixture of reactant and condensation products which further complicates the problem of separating and recovering the desired product, and water is additionally objectionable on the grounds that it retards the reaction.

It has now been found that the autocondensation of liquid acetone can be carried out in a minimum reaction time using an amazingly small proportion of alkali metal hydroxide catalyst, for example sodium hydroxide or potassium hydroxide, with the catalyst finely dispersed in the reactant liquid acetone as a concentrated aqueous solution of the alkali metal hydroxide to form a dispersion of catalyst which is stable substantially throughout the condensation. The concentrated aqueous solutions of alkali metal hydroxide are not miscible with the liquid acetone, but fine dispersion of the aqueous solution in the acetone provides sufficient contact between the catalyst and the acetone to catalyze the autocondensation and produce the equilibrium concentration of the desired product. Entirely unexpectedly it has been found that with the catalyst, in a proportion of only a fraction of a percent of the reaction mixture, finely dispersed as a concentrated aqueous alkali metal hydroxide solution immiscible with liquid acetone, the equilibrium in the autocondensation is achieved in far less reaction time than heretofore, the rate of reaction being up to twelve times faster than the rate of the reaction in which alkali metal hydroxide catalyst is dissolved in a liquid acetone medium.

The invention thus consists of a process for the autocondensation of acetone in the presence of alkali metal hydroxide catalyst, which comprises mechanically dispersing a concentrated acetone-immiscible aqueous solution of the catalyst in liquid acetone to form a reaction mixture of a stable fine dispersion of the catalyst in the acetone, and maintaining the dispersion at appropriate reaction temperatures for the time necessary to complete the desired autocondensation.

The suitable proportions of alkali metal hydroxide for the autocondensations of acetone according to the process of this invention lie between 0.001% and 0.5% by weight of the reaction mixture, and preferably between 0.005% and 0.1% by weight of the reaction mixture, although somewhat higher proportions may be used. Such higher proportions are in excess of the required amount; the excess is not only wasteful, but increases the tendency of the finely dispersed aqueous phase to coagulate into a large mass which separates and settles to the bottom of the acetone phase. Thus higher proportions have less ability to remain effectively dispersed in the acetone and are undesirable and excluded from the present invention. With such minute proportions of catalyst required for the reaction according to the process of this invention, it is not necessary nor even desirable to recover or recycle the catalyst solution that is fed to the reaction. Thus the separation, recovery, and recycling of catalyst solution as has been carried out in the prior art is dispensed with in the process of the present invention.

The acetone used in the process of this invention must contain a sufficiently low proportion of water to be immiscible with the concentrated aqueous solution of alkali metal hydroxide used as catalyst in the process. Acetone containing up to about 3% by weight of water can be used readily and efficiently, and preferably acetone containing less than 2% water is used. Although substantially anhydrous acetone can be used for the process of the invention, there is no advantage achieved by use of this particular material because water is formed as a byproduct in the autocondensation to mesityl oxide and to isophorone and thus is likely to be formed to some extent in the reaction mixture anyway.

Aqueous NaOH or KOH solutions of any strength can be dispersed into acetone of reasonably low water content, e.g. acetone below about 20% by weight of water, and they quickly come to an equilibrium with respect to the partition of water between the acetone and alkali solution phases, giving dispersions of minute droplets of alkali of greater or lesser strength than the starting solution of alkali according to the water content of the acetone. For example at 25° C., posassium hydroxide forms a separate aqueous phase in contact with acetone containing water in the range from about 0.5% to 20%. Acetone containing less than about 0.5% water extracts water from the small proportions of aqueous alkali solutions used as catalyst in this invention to the extent that a substantially solid alkali hydroxide phase is formed, whereas acetone containing water to an extent greater than about 20% completely dissolves alkali hydroxide, forming a single phase system. Dispersions containing so little water in the system that the alkali, originally dispersed as an aqueous solution, becomes a dispersed solid, are satisfactorily catalyzed for purposes of this invention. However, to avoid plugging of lines and valves with solid catalyst particles that may settle out of such dispersions, it is preferred to have sufficient water in the system to maintain the dispersed catalyst as a liquid phase aqueous solution of alkali. With increasing proportions of water in the system the dispersed alkali solution is less concentrated and is a weaker catalyst of decreasing activity. In view of the foregoing factors, it is thus most preferred to use acetone containing between 0.5 to 2% by weight of water and aqueous alkali catalyst solutions initially containing between about 25% and 50% alkali hydroxide for the process of this invention.

Fine dispersion of the concentrated aqueous alkali metal hydroxide solution catalyst in acetone can be achieved by various alternative methods which are suitable for the process of this invention. One method of dispersion for example is agitation of the acetone and catalyst solution by means of an ultrasonic generator, which method produces a fine dispersion of the catalyst solution in the acetone sufficiently stable to achieve the autocondensation of the acetone to equilibrium. A simpler method for finely dispersing catalyst solution in the acetone consists in forcing the catalyst solution and acetone together under pressure through a mixing device such as a centrifugal pump which creates high shear in the mixture, or an orifice, valve, or other constriction in the path of the liquid which creates high shear and a large pressure drop in the flow of the mixture, a pressure drop of about 20–200 lbs./sq. in. (1.4–14 kg./cm.$^2$) being suitable for example, and a pressure drop of about 100 lbs./sq. in. (7 kg./cm.$^2$) being convenient and preferred. The only critical factor about the method of achieving the fine dispersion is that it produces a dispersion of alkali metal hydroxide catalyst in acetone which is substantially stable at least for the length of time during which the condensation reaction is to proceed, i.e. it must disperse the catalyst sufficiently finely that the catalyst remains dispersed at least until the desired condensation has been substantially completed.

The process of this invention can be carried out either as a batch process or as a continuous process. In either case, the process of the invention produces a mixture of materials formed by the autocondensation of acetone, the composition of the mixture depending primarily on the temperature at which the condensation is carried out; in general it is approximately the composition of the equilibrium between acetone and the acetone autocondensation products, formed at the temperature at which the reaction is carried out, that is obtained when a reasonable time of contact between the catalyst solution and acetone of from about five minutes to about five hours is provided for reaction. From the reaction mixtures produced by the process of this reaction, the desired products are obtained by conventional means for separating these products from such reaction mixtures, the methods for separation and recovery of the products being well known in the art of preparing autocondensation products of acetone.

For those condensation reactions which are carried out at temperatures above the atmospheric boiling point of acetone, the reactions must obviously, as in the prior art, be carried out under pressure sufficient to maintain the acetone in the liquid phase.

The invention is illustrated but not limited by the following examples.

EXAMPLE I

This example illustrates the condensation of acetone predominantly to isophorone using as catalyst a concentrated aqueous potassium hydroxide solution dispersed in the acetone by passage of the materials through a throttled valve.

A stream of acetone and a stream of approximately 45% aqueous potassium hydroxide solution were pumped by separate pumps at ambient temperature under high pressure into a common pipeline containing a throttled globe valve with pressure gages mounted in the line on each side of the valve to indicate liquid pressure in the line at these points. The combined streams of acetone and aqueous potassium hydroxide passed through the globe valve and formed a stable uniform dispersion of tiny droplets of the aqueous solution finely dispersed in the acetone; the dispersion was a whitish milky semitransparent liquid from which a small proportion of aqueous potassium hydroxide could coalesce and settle as a separate liquid phase but which retained most of the aqueous potassium hydroxide solution as a dispersed phase. The pressure gages indicated that the pressure drop through the valve was 150 pounds per square inch (10.5 kg./cm.$^2$) while the streams were being mixed by passage through the valve. A sample of the dispersion was analyzed and found to contain, by weight, 0.06% potassium hydroxide, 2.0% water, balance acetone (97.94% by difference). A 75 ml. portion of the dispersion was placed in a 150 ml. stainless steel pressure vessel and the vessel was immersed in a molten salt bath at a temperature of 215–220° C., the vessel and contents of reaction mixture requiring 15 minutes to achieve temperature equilibrium with the salt bath. Reaction at the temperature of 215–220° C. was allowed to continue for five minutes, then the vessel was removed from the bath, cooled rapidly to inhibit further reaction, and the contents removed and analyzed. The proportion of water formed during the reaction was sufficient to make the reaction mixture homogeneous, and the potassium hydroxide phase had dissolved in the aqueous phase by the end of the reaction period. Analysis showed that the acetone in the charge had been converted to the following proportions of products:

|  | Percent |
|---|---|
| Mesityl oxide | 7.0 |
| Isophorone | 17.4 |
| Higher condensation products | 6.4 |
| Water of reaction | 8.8 |
| Unconverted acetone (by difference) | 60.4 |
|  | 100.0 |

EXAMPLE II

A second 75 ml. portion of the catalyst-acetone dispersion prepared in Example I was reacted in the same way as that described above, except that reaction was allowed to proceed for 15 minutes after the pressure vessel had reached the temperature equilibrium at 215–220° C. Analyses of the reaction mixture after the 15 minute reaction showed that the acetone in the charge had been converted to the following proportions of products:

|  | Percent |
|---|---|
| Mesityl oxide | 8.5 |
| Isophorone | 18.4 |
| Higher condensation products | 9.6 |
| Water of reaction | 9.8 |
| Unconverted acetone (by difference) | 53.7 |
|  | 100.0 |

The foregoing Examples I and II show that in the condensation of acetone at 215–220° C. according to the process of this invention, with 0.06% KOH catalyst, the equilibrium concentration of mesityl oxide of 7–8% in the product mixture is achieved in 5 minutes or less; subsequent to such time the formation of higher condensation products consumes mesityl oxide at substantially the same rate as it is formed.

EXAMPLE III

The apparatus described in Example I was used as outlined therein to prepare a dispersion of aqueous potassium hydroxide in acetone having the following composition:

|  | Percent |
|---|---|
| Potassium hydroxide | 0.015 |
| Water | 1.0 |
| Acetone (by difference) | 98.985 |
|  | 100.0 |

Four portions each of 75 ml. of this dispersion were in turn reacted by charging to the pressure vessel described above, heating in the salt bath to 215–220 °C. over a period of 15 minutes, then allowing the condensation reaction to proceed for a measured time at the reaction temperature. Following the reaction period the reaction mixtures were cooled and analyzed. Analysis of the reaction mixtures showed the following compositions of reaction mixture had been achieved in the indicated reaction times:

| Component | Reaction time, percent | | | |
|---|---|---|---|---|
|  | 5 min. | 10 min. | 15 min. | 30 min. |
| Mesityl oxide | 11.3 | 10.7 | 8.0 | 7.8 |
| Isophorone | 8.5 | 11.6 | 13.5 | 14.8 |
| Higher condensation products | 3.1 | 4.6 | 5.3 | 6.0 |
| Water of reaction | 5.0 | 6.8 | 8.5 | 9.0 |
| Uncoverted acetone | 72.1 | 66.3 | 64.7 | 62.4 |
|  | 100.0 | 100.0 | 100.0 | 100.0 |

The separation and recovery of the products in the foregoing reaction mixtures can be achieved by the steps and methods well known in the art.

Comparison of Example III with Examples I and II above shows that, with the smaller proportion of catalyst in Example III under otherwise identical conditions, the equilibrium concentration of mesityl oxide is not reached in 5 or 10 minutes but requires about 15 minutes for achievement. The concentrations of higher condensation products likewise do not rise as rapidly as in the previous examples, because of the lower concentration of catalyst in the reaction.

EXAMPLE IV

This example illustrates the condensation of acetone predominantly to diacetone alcohol in a continuous process using as catalyst a concentrated (approximately 45%) aqueous solution of potassium hydroxide solution dispersed in a continuous stream of acetone at ambient temperature by passage of the material through a throttled valve, as in Example I, to form a stable dispersion. The pressure drop of the materials flowing through the valve was 60 pounds per square inch (4.2 kg./cm.$^2$). Analysis of the dispersion showed that it contained 0.025% by weight potassium hydroxide, 0.83% water, balance acetone (by difference). From the mixing valve the continuous stream of 700 imperial gallons per hour (53.2 litres/minute) of dispersion was passed directly through a series of five reaction vessels which were arranged alternately in series with four heat exchangers equipped with cooling capacity to absorb the heat of condensation and cool the reaction mixture to a desired low equilibrium reaction temperature. The volumes of the heat exchangers were relatively small and the average residence time of the reaction mixture in the exchangers was negligible in comparison to the residence time in the reaction vessels. For the measured flow rate of feed to the reaction vessels, the average residence time of the reaction mixture (Residence Time) in each of the five reaction vessels was calculated and is shown in the table below, together with the cumulative reaction time (Cumul. Time) of the mixture as it passed from each vessel, the temperatures of the reaction mixture as it entered and left each vessel, and the proportions (percent) of diacetone alcohol (Conversion to DAA) in the reaction mixture as it passed out of each of the reaction vessels.

| Reaction vessel | Residence time min. | Cumul. time min. | T., ° C., (in) | T., ° C., (out) | Conversion to DAA |
|---|---|---|---|---|---|
| 1 | 6.8 | 6.8 | 36 | 35 | 9.8 |
| 2 | 10.3 | 17.1 | 35 | 34 | 11.6 |
| 3 | 34.3 | 51.4 | 9 | 13 | 14.2 |
| 4 | 36.0 | 87.4 | 3 | 6 | 14.8 |
| 5 | 137.0 | 224.4 | 2.5 | 4.5 | 19.5 |

Effluent from the last reactor was passed through a bed of ion exchange resin in the acid form to neutralize the potassium hydroxide catalyst, then was distilled by conventional means to recover refined diacetone alcohol therefrom.

The results above show that the conversion of acetone to diacetone alcohol had reached about 12% within just over 17 minutes, at the temperatures extant. This speed of reaction contrasts remarkably with the results obtained at substantially the same temperature with substantially the same proportion of the same catalyst but with the catalyst introduced into the acetone as finely powdered solid potassium hydroxide. With such modification, the process required 19 hours to achieve a conversion to diacetone alcohol of approximately 12% as reported in U.S. Patent 1,701,473.

EXAMPLE V

The procedure of Example IV was repeated, with the following variables being altered:
(1) The pressure drop across the mixing valve in which the aqueous potassium hydroxide solution was dispersed in the acetone was 84 pounds per square inch (5.9 kg./cm.$^2$).

(2) The dispersion contained 0.028% by weight potassium hydroxide, 1.5% water, balance acetone (by difference).

(3) The flow rate of the dispersion and feed to the series of reaction vessels was 408 imperial gallons per hour (31 litres/min.).

The average residence times of the reaction mixture in the reaction vessels, the cumulative reaction time, the temperatures of the mixture flowing into and out of each vessel, and the conversion to diacetone alcohol of the effluent of each vessel are shown in the following table.

| Reaction vessel | Residence time (min.) | Cumul. time (min.) | T., °C.(in) | T., °C. (out) | Conversion to DAA (percent) |
|---|---|---|---|---|---|
| 1 | 11.7 | 11.7 | 28 | 28 | 9.0 |
| 2 | 17.6 | 29.3 | 26 | 26 | 11.6 |
| 3 | 58.7 | 88.0 | 10 | 13 | 14.1 |
| 4 | 61.8 | 149.8 | 6 | 8 | 19.0 |
| 5 | 235.0 | 384.8 | −5 | −1 | 20.8 |

The results of this example illustrate that with a lower rate of feed which permitted (1) a higher pressure drop across the mixing valve, giving better dispersion (2) attainment of lower temperatures with the available cooling capacity and (3) longer reaction times in the reaction vessels, as compared with Example IV, the conversion of nearly 12% diacetone alcohol was achieved in the rather longer time of about 30 minutes, but the conversion to diacetone alcohol finally achieved was around 20%, such value, which is approximately the equilibrium value for the temperature condition, having been substantially achieved within about 150 minutes or two and one-half hours; the same equilibrium required about 225 minutes or three and three-quarter hours for attainment with less effective catalyst dispersion in Example IV.

EXAMPLE VI

This example illustrates the condensation of acetone to diacetone alcohol using as catalyst concentrated aqueous potassium hydroxide solution finely dispersed in acetone by means of ultrasonic agitation.

A water bath comprising a 4.7 litre tank containing 2.8 litres of water was provided with a cooling coil and stirrer for maintenance of a substantially uniform preselected temperature. An ultrasonic generator with a frequency of 40±4 kilocycles and a power output of 60 watts, comprising a crystal transducer, was located in the bottom of the tank. A 250 ml. round glass flask partly immersed in the water bath was charged with 150 ml. acetone containing about 0.5% water and sufficient 45% aqueous potassium hydroxide solution to provide 0.03% by weight of potassium hydroxide in the reaction mixture. The level of acetone in the flask was approximately the same as the water level in the bath. Ultrasonic agitation was applied by the generator for 10 minutes, and cooling of the reaction mixture was initiated during the agitation and continued until the temperature of the reaction mixture was brought to 6° C. The reaction mixture was removed from the flask and part of it was then withdrawn for addition as recycle to a fresh charge of ingredients, to reduce the induction period that occurs in the condensation reaction; a 15 ml. portion of the unfiltered reacted mixture thus withdrawn was added to 135 ml. acetone containing about 0.5% water in the flask, together with sufficient 45% aqueous potassium hydroxide solution to provide 0.06% by weight potassium hydroxide in the total mixture. This mixture was then subjected to ultrasonic agitation for 10 minutes, dispersing the aqueous solution in the acetone as fine droplets that remained dispersed, after which the temperature of the mixture was lowered and periodic samples of the mixture analyzed for diacetone alcohol. The temperatures and proportions of diacetone alcohol (Conversion to DAA) in the reaction mixture at the periodic intervals of cumulative contact time are shown in the following table:

| Contact time | Temperature, °C. | Conversion to DAA, percent |
|---|---|---|
| 10 minutes | 18.8 | 9.5 |
| 20 minutes | 13.2 | 13.6 |
| 30 minutes | 9.0 | 18.3 |
| 40 minutes | 3.4 | 21.4 |

The conversion of acetone to diacetone alcohol at the end of 40 minutes was substantially 100% of the equilibrium value at the given temperature. The diacetone alcohol was separable from the acetone by distillation after neutralization of the reaction mixture, e.g. by contacting it with a cation exchange resin in the acid form.

EXAMPLE VII

This example illustrates a continuous type operation with ultrasonic agitation applied directly to acetone reactant instead of through the intermediate medium of a water bath as illustrated in the preceding example.

Into the tank which had held the water bath in the preceding example, in place of water there was added directly 1.0 litre of acetone at 15° C., which was thereupon agitated continuously by ultrasonic energy from the ultrasonic generator. Additional acetone at 15° C. was continuously fed to the tank, together with a 45% aqueous potassium hydroxide solution, the ratio of the flows of acetone and potassium hydroxide solution being held at 100 to 0.1. A portion of the reaction mixture was continuously removed from the tank at a rate such that a constant liquid volume of one litre was maintained in the tank, representing a nominal hold-up time of 15 minutes. The effluent from the tank was found to contain 8 to 12% diacetone alcohol, and on further cooling to 13° C. for 30 minutes, contained 14% diacetone alcohol which was separable from the reaction mixture as indicated for the material obtained in the preceding example.

Numerous modifications can be made in the various specific embodiments herein described without departing from the invention which is set out in the following claims.

What is claimed is:

1. A process for the autocondensation of acetone in the presence of alkali metal hydroxide catalyst, which comprises mechanically dispersing a concentrated acetone-immiscible aqueous solution of the catalyst in liquid acetone to form a reaction mixture of a stable fine dispersion of the catalyst in the acetone, and maintaining the dispersion at appropriate reaction temperatures for the time necessary to complete the desired autocondensation.

2. A process as claimed in claim 1, in which the proportion of alkali metal hydroxide dispersed in the acetone lies between 0.001% and 0.5% by weight of the reaction mixture.

3. A process as claimed in claim 2, in which the acetone contains between 0.5% and 3% by weight of water.

4. A process as claimed in claim 3, in which the aqueous solution of catalyst contains between 25% and 50% by weight of alkali metal hydroxide.

5. A process as claimed in claim 4, in which the solution of the catalyst is dispersed in the acetone by passing the liquids together under pressure through a constriction which creates a large pressure drop in the flow of the mixture.

6. A process as claimed in claim 5 in which the pressure drop is between 20 and 200 lbs./sq. in.

7. A process as claimed in claim 6, in which the dispersion is maintained at reaction temperature for a period of between 5 minutes and 5 hours.

8. A process as claimed in claim 7, in which the reaction temperature is in the range of −20° C. to 50° C. and in which diacetone alcohol is subsequently recovered as the principal autocondensation product.

9. A process as claimed in claim 7, in which the reaction temperature is in the range 130° C. to 235° C. and in which isophorone is subsequently recovered as the principal autocondensation product.

10. In a process for the autocondensation of acetone in the presence of alkali metal hydroxide catalyst, the improvement which comprises mechanically dispersing a concentrated acetone-immiscible aqueous solution of the catalyst in liquid acetone to form a stable dispersion of catalyst in the acetone by passing the liquids together under pressure through a constriction which creates a pressure drop of between 20 and 200 lbs./sq. in. in the flow of liquids, and subsequently maintaining the resulting liquid dispersion at appropriate reaction temperatures for the time necessary to complete the autocondensation.

References Cited

UNITED STATES PATENTS

| | | | |
|---|---|---|---|
| 2,848,498 | 8/1958 | Mention | 260—594 |
| 3,002,999 | 10/1961 | Lichteberger et al. | 260—594 |

OTHER REFERENCES

Treybal "Mass Transfer Operations" pp. 363 to 366 (1955).

BERNARD HELFIN, Primary Examiner

W. B. LONE, Assistant Examiner

U.S. Cl. X.R.

260—593